United States Patent [19]

Hertel et al.

[11] 4,312,157
[45] Jan. 26, 1982

[54] GREENHOUSE WITH HINGED ROOF SECTIONS

[75] Inventors: Roger D. Hertel, Buffalo Grove; Rick J. Chapman, Vernon Hills, both of Ill.

[73] Assignee: IBG International, Inc., Prairie View, Ill.

[21] Appl. No.: 151,367

[22] Filed: May 19, 1980

[51] Int. Cl.³ .......................... A01G 9/24; E04B 7/16
[52] U.S. Cl. ........................................ 52/13; 52/18; 52/52; 52/66
[58] Field of Search .................... 52/66, 18, 11, 15, 64

[56] References Cited

U.S. PATENT DOCUMENTS

| | | | |
|---|---|---|---|
| 2,280,729 | 4/1942 | Sutton | 52/66 |
| 2,687,102 | 8/1954 | Rongved | 52/18 |
| 3,411,819 | 11/1968 | Tyree | 52/66 |
| 3,572,811 | 3/1971 | Kasten | 52/66 |

FOREIGN PATENT DOCUMENTS 2425649 11/1975 Fed. Rep. of Germany .......... 52/66

*Primary Examiner*—John E. Murtagh
*Attorney, Agent, or Firm*—Fitch, Even, Tabin, Flannery & Welsh

[57] ABSTRACT

A greenhouse structure is formed with a substantially flat and horizontal roof formed of a plurality of roof sections each pivoted about a pivot or hinge end to swing upwardly from a closed position to an open position to admit ambient air to flow into or from the interior of the structure to cool the same. The roof sections are lifted by a lift means which becomes part of the roof supporting structure, and, to this end, the lift means is associated with the vertical support columns. Preferably, the lift means comprises elongated straight lift members each carried by and stabilized by an associated support column for traveling along vertical and rectilinear paths of travel. The preferred means for shifting the lift members and thereby the roof sections comprises a rotatable nut in threaded engagement with the lift member to shift the same vertically as the nut is turned by a worm gear means. The nut and worm gear means are journaled for rotation in integral portions of a plastic housing which is mounted on the support column. A single motor drives a common shaft means which extends to each worm gear means to drive all of the nuts and lift members simultaneously. An internal row of support columns carries a gutter means as well as brackets for supporting hinge pins for hingedly mounting roof sections.

19 Claims, 11 Drawing Figures

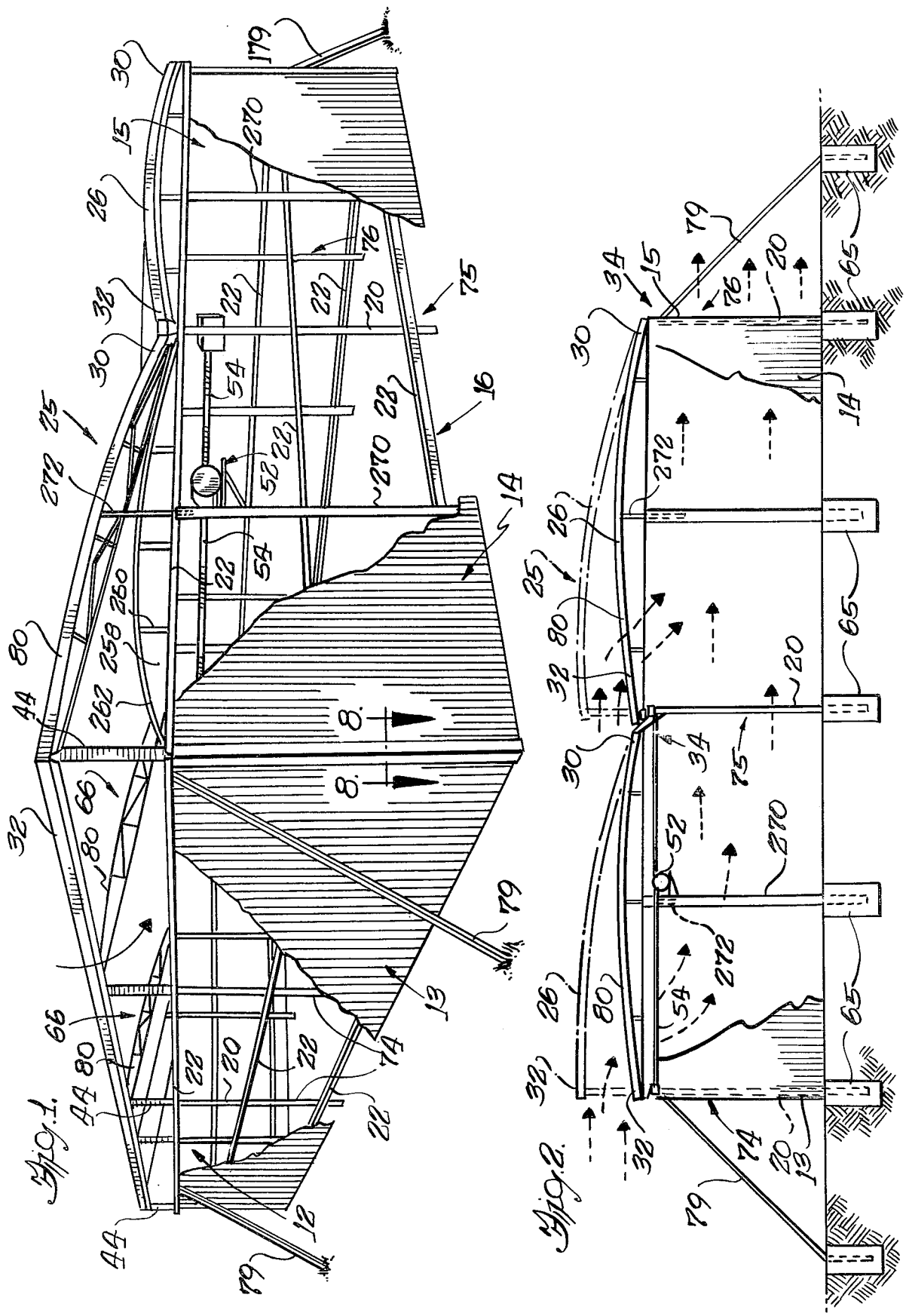

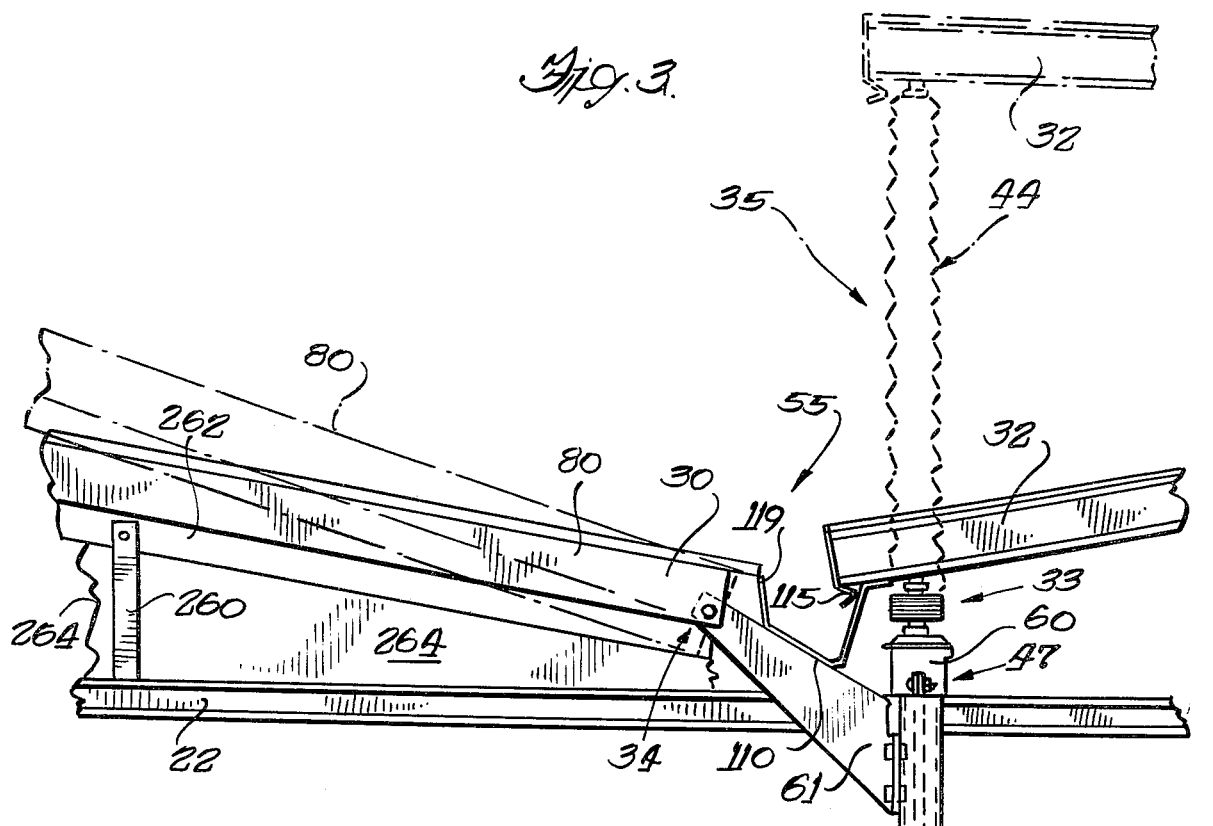
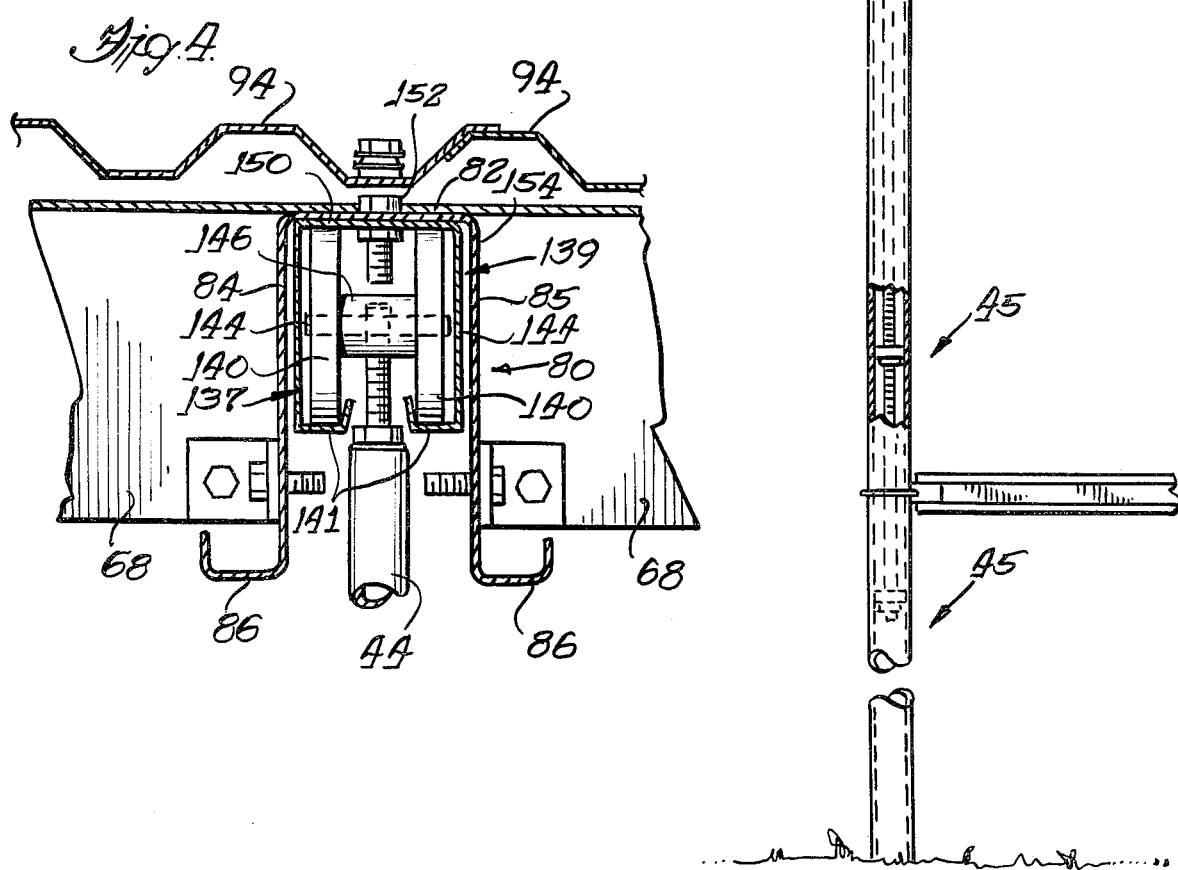

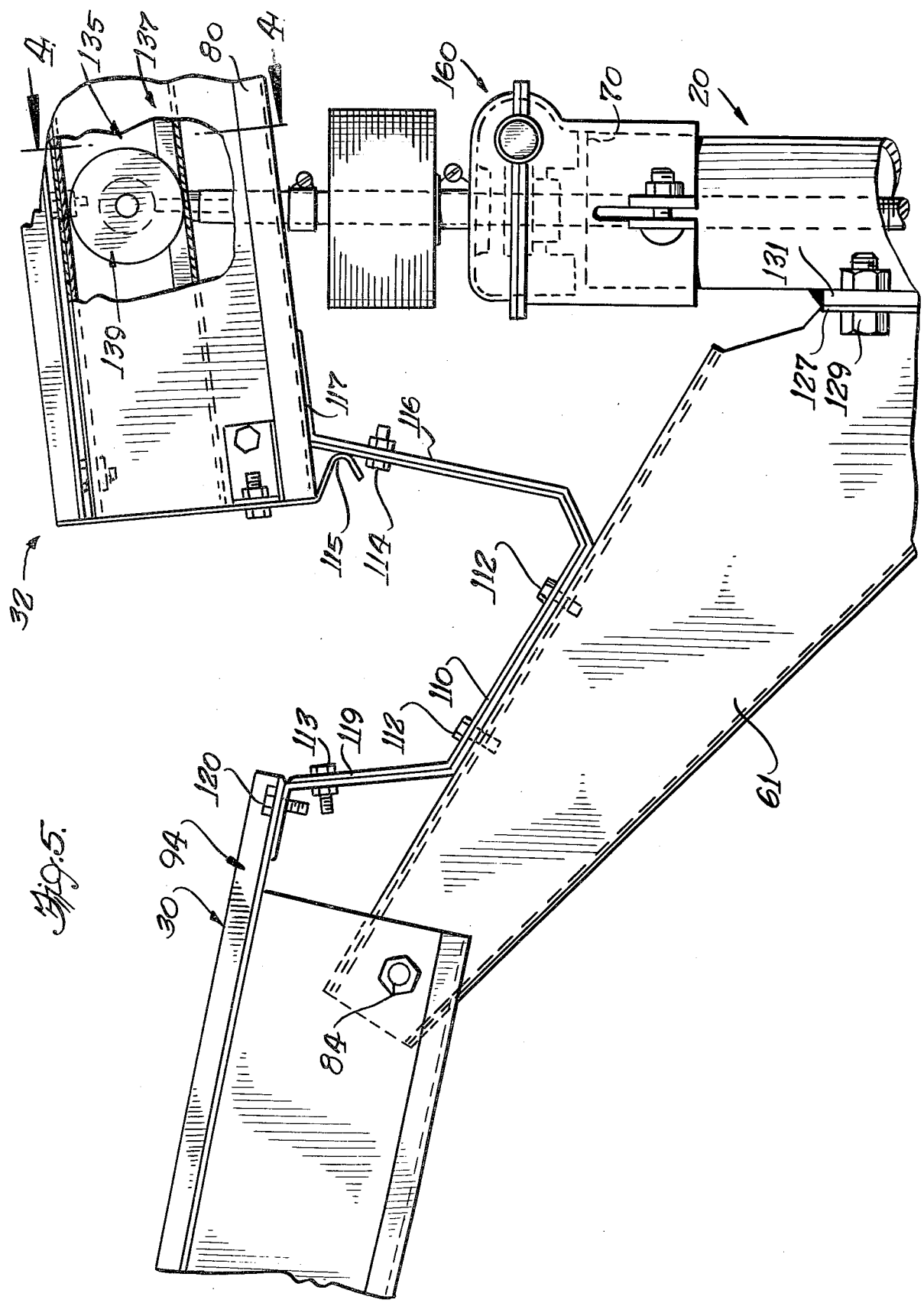

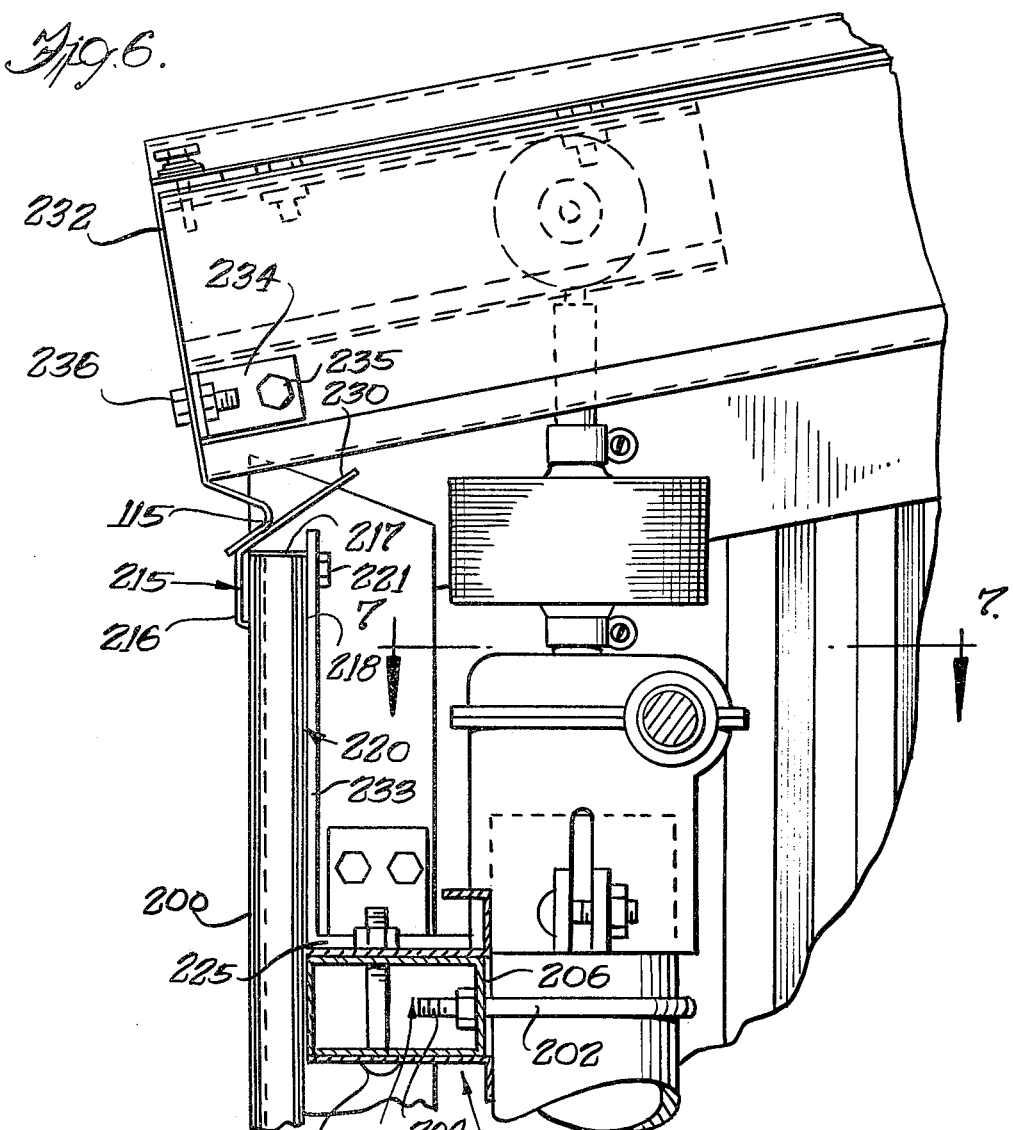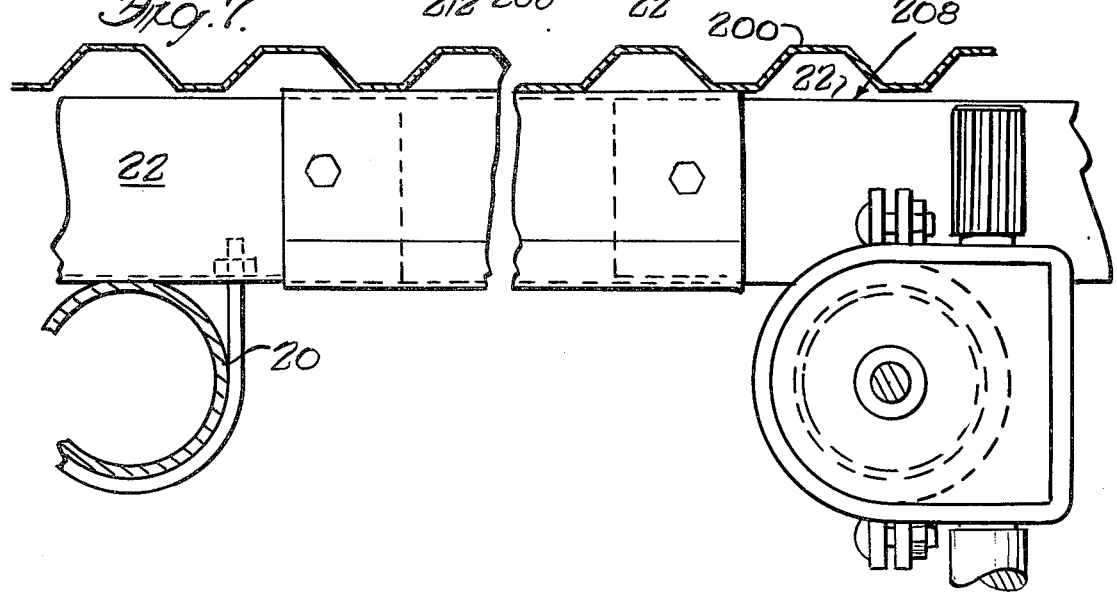

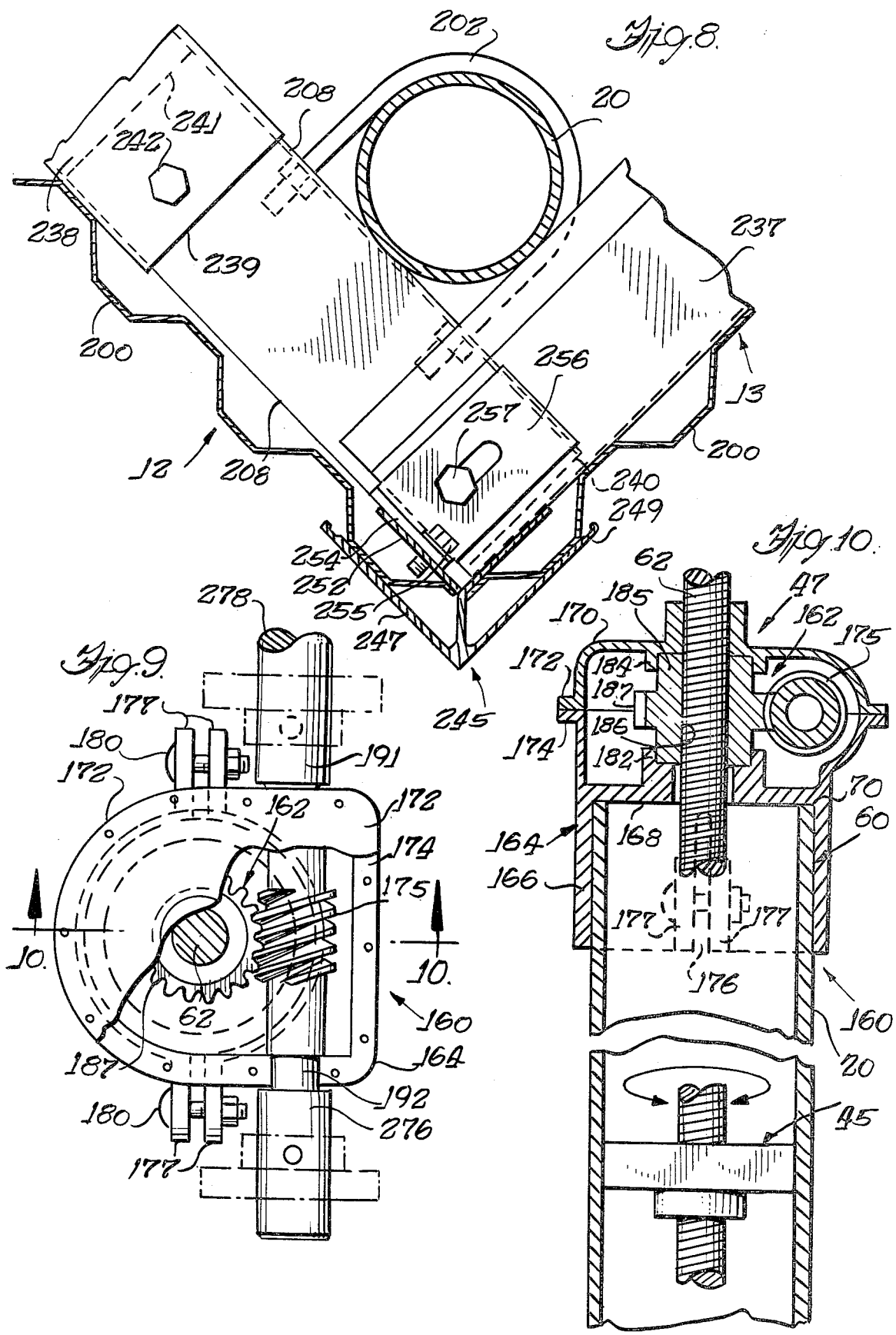

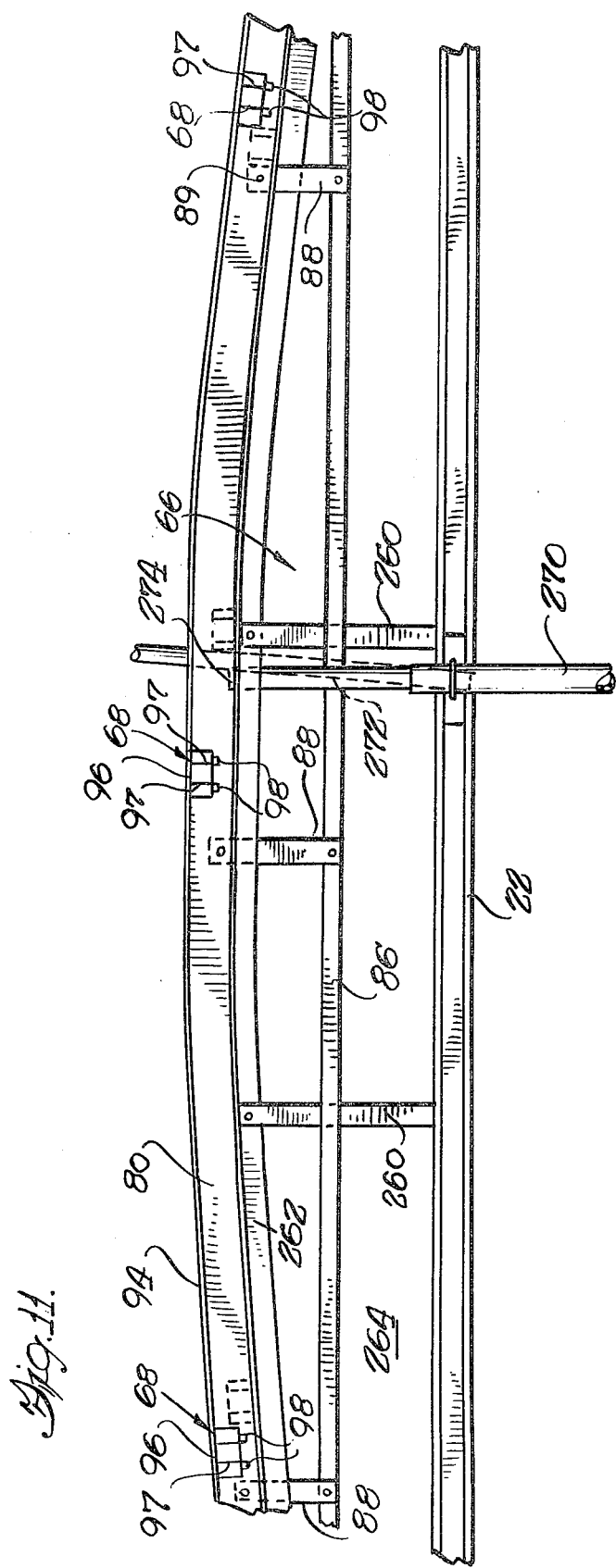

GREENHOUSE WITH HINGED ROOF SECTIONS

This invention relates to greenhouse structures and also to vertically movable roof sections for greenhouse structures for opening to allow ventilation of the interior of the greenhouse.

In conventional greenhouse structures, some ventilation of the interior may be obtained by opening a slidable panel or a hinged window in the roof to allow heat to escape, particularly when the sun is bright and the temperature within the greenhouse is becoming too hot. In such greenhouses, forced air fans or blowers are operated to provide forced air ventilation through these openings in the roof. In these conventional greenhouses, such openings are quite limited in area with respect to the entire area of the greenhouse roof.

It has been proposed heretofore to raise or lift a substantial glazing portion of the roof to provide an open roof ventilator, but such proposals heretofore have not been widely promoted or accepted. Yet, there is a need for a new improved greenhouse structure which provides good natural ventilation during times of heavy heat loads within the greenhouse and which can be constructed economically to cover wide areas of space. For example, in areas such as Florida, U.S.A., there are no substantial snow loads to be born by the roof, and the ambient temperature and the sun load require substantial ventilation if the structure is to be used during the warmer periods of the year, or at times of high sun loads. On the other hand, in the colder and winter portions of the year in Florida, the roof structure should be closed when it is desired to heat the interior of the greenhouse.

As we explained in greater detail hereinafter, the present invention provides for natural convection of ambient air through raised roof sections and a greenhouse side wall to eliminate the cost and need for high volume, forced air equipment and its associated energy costs which would be needed to move such large volumes of air through small openings in a structure to cool the same with ambient outside air. Also, the preferred greenhouse structure is constructed with a low profile and a generally flat roof, when the roof sections are in their closed positions, to reduce the space needed to be heated during cold periods. In addition to the economics involved in operation of a greenhouse, another important financial consideration is the cost of construction on a square foot or area basis particularly when large areas are to be enclosed by the greenhouse structure. Of course, the operating controls and actuating means for moving the roof sections should be relatively simple and inexpensive and yet be capable of supporting relatively large loads in a highly stable condition with wind loads being impressed against the open roof structure.

Accordingly, a general object of the invention is to provide a new and improved greenhouse structure of the foregoing kind.

A further object in the invention is to provide a new and improved roof section and lifting means to provide whole roof ventilation for a greenhouse structure.

A still further object of the invention is to provide a roof section having a superstructure lifted by means which becomes part of the superstructure of the greenhouse.

These and other objects of the invention will become apparent from the following detailed description taken in conjunction of the accompanying drawings in which:

FIG. 1 is a diagrammatic and perspective view of a greenhouse structure constructed in accordance with and embodying the novel features of the invention;

FIG. 2 is a side elevational view showing in dotted lines raised roof sections allowing natural convection of air through a greenhouse structure constructed in accordance with the invention;

FIG. 3 is a fragmentary view showing a hinged end of a roof section and an adjacent lift end of an adjacent roof section;

FIG. 4 is a cross sectional view of a roller and track connecting means taken substantially along the line 4—4 of FIG. 5;

FIG. 5 is a side elevational view of the preferred lifting means and the hinged end of a roof section;

FIG. 6 is a fragmentary view of a lift means for a roof section;

FIG. 7 is a sectional view taken substantially along the line 7—7 of FIG. 6;

FIG. 8 is a cross sectional view of a corner of the greenhouse structure;

FIG. 9 is a partially broken-away view of an actuating nut and lifting assembly;

FIG. 10 is a sectional view taken substantially along the line 10—10 of FIG. 9; and FIG. 11 is a view of a gable end and of a roof truss assembly.

As shown in the drawings for purposes of illustration the invention is embodied in a greenhouse structure 11 having four sidewalls 12, 13, 14 and 15 secured to a building super-structure 16 which includes a plurality of vertical supporting columns 20 and horizontally extending beams 22 which support the sidewalls. A roof 25 is formed of a plurality of roof sections 26 and is supported by the building superstructure to finish the enclosure of an interior space for the growing of plants.

The greenhouse structure 11 of the invention is particularly adapted to cover large areas of space in an inexpensive manner in fairly warm or temperate climates in which there is usually no snow load to be borne by the roof 25. In such climates, such as exist in Florida, U.S.A., during the warmer portions of the year or at times of peak sun loads, it is most desirable to be able to provide a natural convection flow of air through the greenhouse to cool the same without resorting to large forced air movement for cooling as would require considerable power consumption to move the volume of air needed for cooling. In such climates, frosts and periods of low temperature, require the heating of the greenhouse so that the greenhouse should be economical to heat.

In accordance with the present invention, the greenhouse structure 11 is provided with a large substantially flat roof 25 formed of hinged individual roof sections which may be swung to an open position, such as illustrated in dotted lines in FIG. 2, by lifting means 33 leaving a large slot or opening 35 between a lifted end 32 of the roof sections and the top edge of the sidewall 13 or the adjacent gutter allowing air to be conveyed as shown by the directional arrows in FIG. 2 into the interior greenhouse to flow through and out an opposite wall 15 which may be louvered or which may have removeable panels. As will be explained in greater detail hereinafter, the preferred roof sections 26 each have a hinged end 30 opposite the lifted end 32 pivotally mounted by a hinge means 34 to the row of beams 20. In practice the second set of roof sections 26 shown on the righthand portion of FIG. 2 will usually be opened at the same time as the other roof sections shown in dotted line in FIG. 2. The directions in which the openings 35 face may be either into the prevailing winds, as shown in FIG. 2, so that the open wall is on the down wind side. On the other hand, the openings 35 may be faced in the down wind direction where the winds are heavy so that winds blowing over the roof sections 26 create a low pressure at the openings 35 thereby sucking the air outwardly from the building through the openings 35. In either event, the building may be cooled by natural convection of air with the openings 35 and opposed open side wall portion providing a very substantial air flow as contrasted to greenhouses having small panels or windows in the roof. In a sense, the greenhouse has an open roof when the roof sections are all in their open position. Of course, such large roof sections 26 should be stabilized and opened and closed with inexpensive, generally maintenance free, and preferably low cost lifting and actuating mechanisms.

To this end and in accordance with the further aspect of the invention, the roof sections 26 are lifted by and stabilized in their open positions by a lifting means 33 having a plurality of straight lift members 44 each which moves rectilinearly along an associated supporting column 20 which stabilizes the lifting member and to which is transmitted the weight of the lifted end 32. In the preferred embodiment of the invention, the lift members 44 are rods or shafts which are contained within the hollow interior of the support columns with the lower ends of the lift members stabilized by a stabilizing means 45 (FIG. 10) engageable with the column. A low cost and inexpensive actuating means 47 for the lift members 44 is affixed to the columns and also acts to stabilize the lift members 44 as well as to raise or lower the lift members 44. Herein, the actuating means 47 includes gear box means 60 each having a geared relationship with a lift member 44 to drive the same upwardly or downwardly. To lift the roof sections 26 equally and simultaneously, the actuating means 47 further includes a drive motor 52 and a drive shaft 54 and right angle gear box 282 extending between and driving each of the gear boxes simultaneously.

The roof sections form a generally horizontal and flat roof 25 with each of the roof sections being cambered between its lift end 32 and its hinged end 30 to provide water run off into gutters 55 (FIG. 3) which are mounted on brackets 61 secured to an interior row of columns 20. As will be explained in greater detail, the roof sections 26 each comprise a supporting roof superstructure 64 including a truss 66 and horizontally extending purlins 68 which support the large roof panels of a light transmitting material such as fiberglass or double ply sheets of plastic film. Thus, the entire roof including roof superstructure is lifted to provide the cooling rather than only a single window or panel without the roof superstructure.

Referring now in greater detail to the preferred and illustrated embodiment and of the invention, the vertical columns 20 are preferably hollow steel tubes which have lower ends secured to the ground such as by encased in piers 65 of concrete extending below grade 67 which may be an earthen floor.

The preferred structure is the relatively low structure, particularly with the general flat horizontal roof 25. By way of example only, the beams 20 have top ends 70 (FIG. 5) located only 9 ft. 6 in. from the grade floor 67 with the camber roof 25 located only slightly thereabove. The preferred arrangement of the columns 20 is to have a first row of columns 74 (FIG. 2) beneath the lift ends 32 of the roof sections and adjacent the side wall 13. Another interior row 75 of columns 20 are aligned in a longitudinal direction and serve to support both the hinge ends 30 of the roof sections as well as the lift ends 32 of the adjacent roof sections, which are shown in their closed position in FIGS. 1 and 2. A third row 76 of columns 20 are adjacent the sidewall 15 and support hinge ends 30 of the right hand roof sections as viewed in FIGS. 1 and 2.

It should be apparent that the building structure 11 may be extended considerably in either the longitudinal direction of the rows of beams 74, 75 and 76 or in the lateral direction, that is in roof span direction. By way of illustration only, the roof sections 26 are 12 feet wide and are 21 feet in span from the row 74 of columns 20 to the row 75 of columns 20. Suitable exterior braces 79 may be attached to the structure to assist in holding the same against loads.

Each of the preferred and illustrated roof sections 26 has a rafter 80 at opposite sides thereof for spanning a column 20 in the first row and a column 20 in the second row 75, with the preferred rafters 80 having a twenty-one foot length, and a generally hat-shaped cross section, as best seen in FIG. 4. More specifically, the rafter is formed with an upper or top web or flange 82 with a pair of integral depending spaced legs 84 and 85 terminating in a lower channel shaped ends 86 which serve as condensate receiving and conveying channels. Each rafter has on its interior side a bracing truss assembly 66 which comprises, as best seen in FIG. 11, a long lower horizontally extending, straight pipe or member 86 bolted at opposite ends to the depending legs 84 and 85 of the rafter. The truss assembly further includes vertically extending struts 88 which are bolted at upper ends to the rafter and bolted at lower ends to the horizontal pipe 86.

Extending between the two rafters 80 each located along a side of the roof section 26 are at least three central purlins 68 FIG. 11 also of hat-shaped configuration joined in a well-known manner to the respective rafters being spanned thereby. Preferably, each of the purlins has a top flange web 96 for supporting the fiber glass and with a pair of depending legs 97 ending in condensate receiving channels 98. In this illustrated embodiment of the invention, the roof panels 94 are formed of corrugated fiber glass sheets which are secured to the rafters 80 and purlins 68 in a well-known manner. Thus, each roof section 26 includes a roof superstructure 64 comprising a pair of rafters 80 spanned by a plurality of purlins 68 with each rafter having its own truss assembly 66. Thus, when the roof section 26 is pivoted, this entire roof superstructure carrying the roof panels 94 is pivoted and not merely a panel or two without the roof superstructure. The roof panel 94 which is supported between adjacent rafters is preferably made of a lightweight and inexpensive material which will transmit the light to the plants within the structure. For such large areas, the use of heavy glass for the roof panels is not recommended. On the other hand, the use of lightweight plastic films particularly double films, may be used for the roof panels 94 and may provide increased heat insulation over the fiber glass panels illustrated herein.

The gutters 55 are formed, as best seen in FIGS. 3 and 5, with a trough-shaped cross section having a bottom wall 110 secured at opposite ends of its twelve-foot span by a pair of screws 112 threaded into the inclined top wall of the bracket 61. The gutters are formed of sections 12 feet and 2 inches in length and spanning a pair of columns 20 and the ends of the adjacent gutter sections are overlapped and they are secured to each other by the screws 112 and by nuts and bolts 113 and 114 to form a continuous gutter extending across roof sections 26 from one side wall 12 to the opposite side wall 14. One side 116 of the gutter is preferably inclined to the vertical to have sliding contact with a curved and depending flange 115 of an adjacent lift end 32 of the roof section 26. The leg 116 is free standing and flexible and has an upwardly and inwardly bent lip 117 abutting the under side of the roof rafter 80 of the adjacent lift end 32 of an adjacent roof section. The gutter 55 also has an opposite upstanding inclined leg 119 extending to the roof panel 94 and the leg 119 is fastened to the edge of the roof panel 94 by screws 120. Because of the flexibility in the roof panels 94 and in the inclined gutter walls 119 and because the hinged end 30 of the roof section experiences a relatively small displacement, there is no need to allow the sliding of the roof panel relative to the gutter leg 119 during pivoting of the roof section.

The gutters 55 are preferably pitched in one direction with a pitch of, by way of example, about ½ inch for 12 feet with the pitch extending all in one direction except for very long greenhouses in which the pitches of the gutters extend in opposite directions from the center of the greenhouse.

The respective support brackets 61 on the columns 20 of the central row 74 are joined to the columns by transversely extending flanges 127 bolted by bolts 129 to a flat, vertical plate 131 which is welded to the outer side of a tubular column 20 adjacent the upper end 70 of the column. Each of the brackets is precisely located relative to the grade 67 so the hinge pins 84 are aligned to define a common axis along a straight line through all of the brackets 61. The brackets 61 are of substantial strength as they support the weight of the hinged ends 30 of the roof sections 26.

It should be appreciated that as the lift end 32 moves upward it partakes of an arcuate travel having a radius extending through into the pivot pins 84, which in this instance is approximately 21 ft. When using linear lift members 44 which have a straight, rectilinear, vertical path of travel, it is preferred to provide a connecting means 135 which allow the lift end 32 to have a lateral component of displacement relative to the upper end of the lift member 44. In this instance, the preferred and illustrated connecting means 135 between the roof lift end 32 and the lift member 44 comprises a roller and track means 137 with a roller means 139 rolling along a track means 141 as the lift end pivots about its hinged end. The preferred roller means 139 includes, as best seen in FIG. 4, a pair of rollers 140 each mounted on a common axle 144 (FIG. 4) on a block 146 secured to an upper threaded end 148 of the vertical lift member 44. Each of the rollers 139 supports a portion of the weight of the roof. The track means comprises a channel mounted within the hat-shaped rafter 80 and having an upper wall 150 secured by fasteners 152 to the inner side of the rafter web 82. The track channel has a pair of depending flanges 154 with inturned flanges along which roll the rollers 139.

The preferred actuating means 47 for the lift members 44 comprises an actuator assembly 160 (FIG. 5) which rests on the top end 70 of each of the columns 20 beneath the lift end 32 of the roof. The preferred actuator assembly includes a worm gear drive 162 (FIGS. 9 and 10) which turns the threaded shaft 62 of the lift member 44 to raise or lower the same. Referring more specifically to FIGS. 6, 7, 9 and 10, it will be seen that the actuator assembly 160 includes a lower or bottom housing 164 which has a depending cylindrical sleeve 166 having an internal diameter to telescope on to the top end 70 of the column 20, as best seen in FIG. 10. A horizontal web or base 168 at the top of the cylinder 166 abuts and rests on the upper end 70 of the column 20. A top housing 170 for the actuator assembly 160 is likewise formed of molded plastic and is provided with an outer connecting flange 172 for being secured by fasteners to a similar flange 174 on the bottom housing 164 thereby providing a parting line at the axis of worm gear 175. The housing sleeve 166 is provided with slots 176 on the lower end thereof and is provided a pair of outwardly extending clamping ears 177 on opposite sides of each vertical slot 176. A clamping fastener 180 extends through openings in each of the ears 177 and is tightened to cause the sleeve 166 to tightly grip the top of the column to prevent movement of the sleeve relative to the column 20.

A low cost actuator assembly 160 is afforded by using the plastic housings 164 and 170 to provide internal, integral bearing sleeves 182 and 184 (FIG. 10) respectively for holding the upper and lower ends of a plastic gear rotatable nut 185 having a threaded and hollow interior with an acme thread 186 meshed with a similar thread on the threaded shaft 62, as best seen in FIGS. 9 and 10. The outer central portion of the plastic gear nut 185 is formed with a plastic gear 187 which is meshed with a plastic worm gear 175 on an actuating steel shaft 191 extending horizontally through the actuator assembly. The plastic gear nut 185 with an internal acme thread 186 and gear teeth 187 are one plastic piece. Opposite ends of the shaft 191 have reduced ends 192, as best seen in FIG. 9, journaled for rotation in semicircular bearing portions integrally formed in the plastic housing. Thus, both worm gear 175 and the nut 185 are journaled for rotation by the plastic housing itself without special bearings.

The preferred walls 12, 13, 14 and 15 are formed in an inexpensive manner by attaching large corrugated panels 200, e.g. fiber glass sheets approximately four feet wide and almost ten feet in height, as best seen in FIGS. 6, 7 and 8 to the horizontally extending beams 22 which in turn are clamped by a means, as best seen in FIGS. 7 and 8, to the columns 20. Herein, self threading screws (not shown) are threaded from the exterior of the fiber glass sheets into the three beams at about every third corrugation. The illustrated beams 22 also have the shape of hat-shaped cross sections and are secured to the columns 20 by means of U-shaped bolts 202 (FIG. 6) fastened to the columns and having ends 204 projecting through apertures in a vertical web 206 of U-shaped purlin clips 208 fitted into the interiorly facing open slot of U-shaped purlin beam at the location of columns in the rows 74, 75 and 76. The purlin clips extend longitudinally only a short distance and join purlin sections which are slightly less than twelve feet in length in this instance. Vertical extending bolts 212 join the clips to adjacent ends of purlin sections to define a purlin beam 22.

The upper edge of the respective sidewalls 12 and 15 is defined by a longitudinally extending top cap 215 (FIG. 6) which has a downwardly facing channel defined by an outer leg 216, a central upper web 217 and an inner depending leg 218. The channel defined thereby fits onto the top of the fiber glass sheet with the outer and inner legs of the cap extending across the corrugations and the top web 217 resting on the top of fiber glass sheets. The cap 215 is secured by screws 221 to an angle shaped bench bracket 220 having a long vertical leg 223 and a short horizontal leg 225 fastened to the top beam 22.

The top caps 215 have a portion for sealing engagement with the roof section when the latter is in its closed position, as shown in FIG. 6. More specifically, an inclined flange 230 of the top cap is inclined upwardly and inwardly and is abutted by the angled shaped flange 115 of a top cord cap 232 which is fastened by an L bracket 234 and fasteners 235 and 236 to the roof rafters. The top cord cap 232 and its flange 115 extend longitudinally between adjacent columns as does the flange 230 to provide a seal when abutted across the top edge of the wall 12. The flange 230 is preferably of light weight metal which can deflect and slide along the inclined flange 115. These inclined surfaces allow for variations in height or tolerance with one inclined surface sliding on the other inclined surface.

The preferred manner of joining the beams 22 at the corners of the building will now be described. Horizontal purlins 237 for the wall 13 continue beyond the column (FIG. 8) while the purlins 238 for the wall 12 terminate short of the corner at ends 239 which are fastened to purlin clips 208, the latter being fastened to a corner column 20 by a U-bolt 202. This corner purlin clip has one end 240 fitted inside the twelve foot purlin 237 and its opposite end 241 is fitted inside the twenty-one foot purlin 238 and is secured thereto by a fastener 242. A vertically extending corner bar 245 covers and seals the ends of the respectively adjacent side wall panels 200 and for this purpose has vertical strips 247 and 249 meeting at right angles outwardly of the panels to cover the ends of the panels. Interior strips 251 and 252 on the corner bar abut the beams 22 at the corner and are secured thereto by an angle bracket having a vertical leg 254 secured by a screw 255 and a horizontal leg 256 fastened by fastener 257 to the purlin 237 and purlin clip 208. Manifestly, the corners of the greenhouse may be constructed in various other manners.

In order to close the space between the top beam 22 and the cambered rafters 80 overhanging the structure sidewalls 12 and 14, gable walls 258 are formed above the top beam 22 and below the rafter to enclose the space therebetween. More specifically, as best seen in FIGS. 11 and 3, gable brackets 260 are secured at their lower ends to the top beam 22 and a gable top bar 262 at their upper ends. The gable top bar is an extrusion fitted onto the top of fiber glass gable panels 264 and has a top curved edge 262 to meet the curved facing underside of the roof rafter to define a seal therebetween when the roof section is closed. The gable panels 264 are fastened by screws to the gable brackets 260.

To provide further stability and to assure that the roof section closes properly with the gable walls 258 it is preferred to employ a gable column 270 equally spaced between the lift end 32 and hinge end 30 of the roof section 26 and adjacent the gable ends of the building, i.e. at the location of the side walls 12 and 14 and to provide roof stabilizer bars 272 (FIGS. 1 and 2) for connecting the roof sections 26 to the gable columns 270. The preferred gable columns are similar to the described columns 20 except that each of their upper open ends receives therein in sliding relationship the lower end of the stabilizing bar 272. The upper end of the bar 272 is connected by a pivot pin 274 to the rafter to allow the upper end to travel in an arc about the roof hinge axis. The lower end of the stabilizer bar has a sufficiently loose fit inside the column that it doesn't bind when the roof section is fully extended and then retracted. The length of the bar is sufficient not to be pulled from the column when the roof section is fully opened.

Because of the lightweight roof sections and because of the low friction actuator assemblies, it has been found possible to open as much as 10,000 square feet of roof sections with a single one horsepower motor. In the preferred embodiment, a one horsepower motor 52 (FIG. 2) is mounted on a gable column 270 adjacent the wall 14 and drives a common shaft 54 extending to right angle gear boxes 282 mounted on the end columns in column rows 74 and 75. The gear boxes have a one to one gear ratio for driving an adjacent actuator assembly 160. Thus, for example, an output shaft of a gear box 282 is connected to an input end 276 of the worm gear shaft 191 and on the other or output end of the shaft 191 is connected to a cross shaft 278 which extends along the top of the frontside wall 13 to a similar actuator assembly 160. The cross shafts 278 extend along the top of each of the column rows 74 and 75 to drive all actuator assemblies 160 by the common motor 52. Thus, the single motor 52 drives each of the actuator assemblies simultaneously so that all of the roof sections lift simultaneously at the same rate and are displaced the same distance. The worm gear assemblies and the friction in the actuating drive means hold the roof sections 26 upwardly in a lifted position. The motor 52 must also be operated in a reverse direction to lower the roof sections.

From the foregoing, it will be seen that the present invention provides an open roof greenhouse structure in which the roof sections may be swung open with a limited amount of energy to allow cooling by natural air convection. More specifically, a common actuating means including one motor can be used to open all of up to two or more roof sections simultaneously. The hinged ends of the roof structures and the linear lift members stabilize the roof structures in their opened position. Inexpensive lift means are provided by straight linear lift members being driven by a nut and worm gear mounted for rotation in a plastic housing. The lift members project into and are carried by the columns. The entire greenhouse is readily constructed and formed in an inexpensive manner as compared to other and more conventioned greenhouse structures having high gabled ends for the greenhouse.

What is claimed is:

1. In a greenhouse structure, the combination comprising: a plurality of vertical columns at spaced longitudinal and lateral positions defining laterally spaced rows of columns, vertical side walls for said structure interconnected with said columns, roof sections having hinge ends for pivoting about a hinge axis and oppositely disposed lift ends for being lifted relative to said sides wall to define open slots allowing ambient air flow into or from said structure, said roof sections spanning the laterally spaced rows of columns and being supported thereby, said roof sections including a superstructure and light transmitting panels thereon covering a substantial extent of said roof section, means for hingedly mounting ends of said roof section to one row of said columns, and lifting means connected to another row of columns and to said lift ends of the roof sections for pivoting the lift ends about said hinge axis to an open position allowing ambient air to flow into or from the interior of the greenhouse structure.

2. A greenhouse structure in accordance with claim 1 in which said lifting means comprises lift members movable along rectilinear paths and having lower portions stabilized by said columns at spaced points therealong, and an actuating means mounted on said columns to move said lift members along said rectilinear paths.

3. A greenhouse structure in accordance with claim 2, in which said actuating means comprises a plurality of driving gear means each in driving engagement with one of said lift members for lifting opposite points on said lift end of said roof simultaneously.

4. A greenhouse structure in accordance with claim 2, in which lift members are straight shafts disposed within said columns for vertical movement therein and in which a substantial lower portion of said lift members remain within its associated column to hold and to stabilize its associated roof section in the open position.

5. A greenhouse structure in accordance with claim 4, in which said means for hingedly mounting said roof sections include hinge brackets on said one row of columns and hinge pins thereon aligned to define a horizontal hinge axis for said hinge end and in which a connecting means allows said lift end of said roof section to swing in an arcuate path while said lift members are moving in a straight line vertical path.

6. A greenhouse structure in accordance with claim 5 in which said connecting means comprises a roller means and a track means with said roller means movable in said track means, said roller means moving laterally as said lift end of said roof section swings in an arcuate path.

7. In a greenhouse structure, the combination comprising: a plurality of hinged roof sections, a plurality of rows of roof-supporting columns, each of said roof sections being substantially flat but having a superstructure and light transmitting panels thereon, hinge means interconnecting said roof sections to columns aligned in a first row, lift ends on said roof sections supported by other columns aligned in other rows, and lifting means associated with said other rows of columns for supporting the lift ends of the roof sections and for lifting said lift ends upwardly to an open position to allow ambient air to flow into or from the interior of said greenhouse structure.

8. A greenhouse structure in accordance with claim 7 in which said lifting means comprises elongated, straight lift members extending longitudinally along and supported and guided by an associated column, and a common actuating means extending longitudinally between said columns and driving said lift members simultaneously and through equal distances in a vertical direction to lift a plurality of lift ends simultaneously.

9. A greenhouse structure in accordance with claim 8 in which said vertical lift members are threaded shafts, a stabilizing means is associated with each of said threaded shafts and with each of said columns for stabilizing the lower ends of said threaded shafts, and a connecting means connects the upper ends of threaded shafts to said lift ends of said roof sections to allow arcuate travel of said lift end about an axis through said hinge means while said vertical lift members travel along a rectilinear path.

10. A greenhouse structure in accordance with claim 7 in which said roof sections having a slight camber, gable walls extend between side walls and the cambered roof sections to close opposite ends of said greenhouse, and gable columns means are disposed adjacent said gable walls to stabilize said roof sections at said gable walls.

11. A greenhouse structure in accordance with claim 10 in which said gable column means comprises a gable column and a stabilizer extending between said roof section and said gable column, said stabilizer being extensible along and being guided by said gable column when said roof section is raised.

12. In a greenhouse structure, the combination comprising:
a plurality of vertical columns, a roof section having a pivot end and lift end;
means connecting said pivot end to first ones of said columns for swinging movement with respect to said columns;
lifting means, including a threaded shaft, connected to said lift ends of said roof section and to others of said columns to swing said lift end to an open position to allow ambient air to flow through a space created by raising the lift section;
an actuating means for moving said threaded shaft, said actuating means carried by said other of said columns and including a threaded nut threadingly engaging said shaft and mounted for turning and for shifting the threaded shaft vertically, a plastic worm gear in said actuating means in threaded engagement with said nut to turn the same to raise or lower said threaded shaft, and motor means to turn said plastic worm gear and said nut to shift said lift member and said lift end of said roof section.

13. A greenhouse in accordance with claim 12 in which said actuating means further comprises a plastic housing means having integral portions for journaling said threaded nut for rotation about a substantially vertical axis and integral portions for journaling said worm gear for turning about a substantial horizontal axis.

14. A greenhouse in accordance with claim 13 in which said housing means comprises a sleeve portion for fitting onto the top of a column and further comprises a separable bottom housing portion and upper housing portion, with said journaling portions being in both said upper and lower housing portions.

15. A greenhouse in accordance with claim 12 in which a common driving means extends between at least two actuating means for each lift end of said roof section and is connected to turn simultaneously the worm gears and nuts in the respective actuating means to lift equally and simultaneously the opposite lift ends of said roof section.

16. In a greenhouse structure,
a substantially flat horizontal roof formed of a plurality of roof sections each having camber between a lift end and a pivot end,
a plurality of vertical side walls cooperating with said roof to enclose said structure,
a row of internal columns in said structure for supporting the hinge end of one set of cambered roof sections and the lift end of an adjacent roof section, gutter means supported by said columns to receive water from said hinge end of one roof section and water from the other lift end of an adjacent roof section when the latter is in a lowered and closed position.

17. A greenhouse structure in accordance with claim 16 including a sealing means for said lift ends of said roof sections for sealing engagement with a stationary portions of the structure when said roof sections are in the closed position.

18. A greenhouse structure in accordance with claim 17 wherein said sealing means comprising a sealing member on said lift end for sealing with a portion of said gutter means when the lift end is lowered into its closed position, said sealing means also including a sealing member for sealing engagement with an upper edge of a sidewall for said greenhouse structure.

19. A greenhouse structure in accordance with claim 15 in which said gutter means has one side fastened to said hinged end of one of said roof sections and has a surface on the other side of said gutter means for sealing with said sealing member on said lift end.

* * * * *